United States Patent

Shinoda

[11] Patent Number: 6,044,970
[45] Date of Patent: Apr. 4, 2000

[54] GOLF INSTRUMENT

[75] Inventor: Maki Shinoda, Tokyo, Japan

[73] Assignee: Bridgestone Sports Co., Ltd., Tokyo, Japan

[21] Appl. No.: 09/295,391

[22] Filed: Apr. 21, 1999

Related U.S. Application Data

[60] Provisional application No. 60/082,880, Apr. 24, 1998.

[30] Foreign Application Priority Data

Apr. 22, 1998 [JP] Japan .................................. 10-128169

[51] Int. Cl.[7] .................................................. B65D 25/00
[52] U.S. Cl. ..................................... 206/315.1; 206/459.1
[58] Field of Search .............................. 206/315.1, 315.9, 206/579, 459.1, 459.5

[56] References Cited

U.S. PATENT DOCUMENTS 5,142,384  8/1992  Wood et al. .......................... 206/459.1
5,222,597  6/1993  Bluthardt et al. ..................... 206/315.9

*Primary Examiner*—Jacob K. Ackun
*Attorney, Agent, or Firm*—Sughrue, Mion, Zinn Macpeak & Seas, PLLC

[57] ABSTRACT

An object of the invention is to provide a golf instrument which attractively displays the appearance and quality of golf tools such as golf balls. This is achieved with a golf instrument comprising a golf tool or golf tool package having a hologram wherein there is formed an irregularly reflecting area which irregularly reflects incident light, and there are also formed, within the irregularly reflecting area, both a first regularly reflecting area which regularly reflects incident light from a predetermined angle for displaying an external view of the golf tool, and a second regularly reflecting area which regularly reflects incident light from a different angle than the above angle for displaying the internal structure of the golf tool.

2 Claims, 2 Drawing Sheets ical film 25 may be formed of, for example, a metal

GOLF INSTRUMENT

CROSS REFERENCE TO RELATED APPLICATION

This application is an application filed under 35U.S.C. § 111(a) claiming benefit pursuant to 35 U.S.C. § 119(e)(i) of the filing date of the Provisional Application Ser. No. 60/082,880 filed on Apr. 24, 1998 pursuant to 35 U.S.C. § 111(b).

BACKGROUND OF THE INVENTION

1. Field of the Invention

The present invention relates to a golf instrument comprising a golf tool or a golf tool package, and in particular a golf ball box or other golf ball package, having a holographic display.

2. Prior Art

Holographic displays have hitherto been provided on packages and the like for decorative effects, but these for the most part offer an attractive appearance by an iridescent change of colors or display a three-dimensional pattern. Their use for displaying the contents and quality of packaged wares has not previously been contemplated.

SUMMARY OF THE INVENTION

An object of the present invention, which was conceived in light of the above circumstances, is to provide a golf instrument which attractively displays the contents and quality of a golf tool such as a golf ball.

The invention provides the golf instrument described below in order to achieve the above object.

claim 1: A golf instrument comprising a golf tool or golf tool package having a hologram wherein there is formed an irregularly reflecting area which irregularly reflects incident light, and there are also formed, within said irregularly reflecting area, both a first regularly reflecting area which regularly reflects incident light from a predetermined angle for displaying an external view of the golf tool, and a second regularly reflecting area which regularly reflects incident light from a different angle than the above angle for displaying the internal structure of the golf tool.

claim 2: The golf instrument according to claim 1 comprising a golf ball package having a hologram wherein there is formed an irregularly reflecting area which irregularly reflects incident light, and there are also formed, within said irregularly reflecting area, both a first regularly reflecting area which regularly reflects incident light from a predetermined angle for displaying an external view of the golf ball, and a second regularly reflecting area which regularly reflects incident light from a different angle than the above angle for displaying the internal structure of the golf ball.

According to this invention, the hologram provided on the golf tool or golf tool package appears iridescent on account of the light that strikes the irregularly reflecting area, which effect is attractive in and of itself. Depending on the angle at which the hologram is seen, an external view of the golf tool, such as a golf ball, appears to stand out in relief due to the first regularly reflecting area. When the hologram is provided on a package in particular, the contents of the product packaged therein are displayed. Thus, if the package is a golf ball box, for example, the hologram shows that the product contained therein is a golf ball. When the hologram is viewed from a different angle, the structure of the golf tool, such as a golf ball, appears to stand out in relief due to the second regularly reflecting area. In the case of a golf ball, for example, the internal structure is displayed, showing whether this is a solid golf ball or a thread-wound golf ball, and whether the cover consists of one layer or of two or more layers. Accordingly, not only does the hologram have a beautifying effect, it is also able to display at the same time the contents and quality (internal structure) of the golf tool in an aesthetic manner.

Examples of the foregoing golf tool include golf balls, golf clubs, golf bags, golf shoes, and golf gloves. The invention is particularly well suited to the holographic display of the outward appearance and internal structure of golf balls by means of a hologram formed on a package for golf balls, such as a golf ball box.

DETAILED DESCRIPTION OF THE INVENTION

Figure 1:
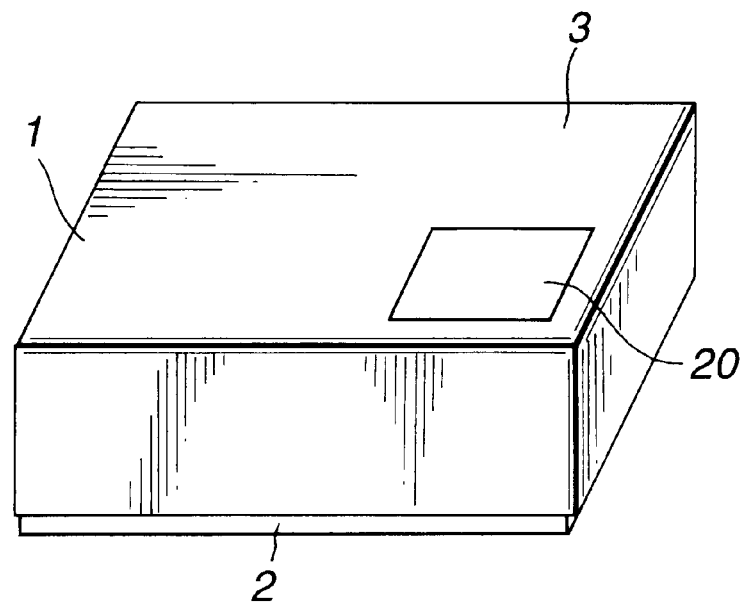
FIG. 1 is a perspective view of a golf ball box according to one embodiment of the present invention.

Embodiments of the invention are described below while referring to the drawings.

Figure 2:
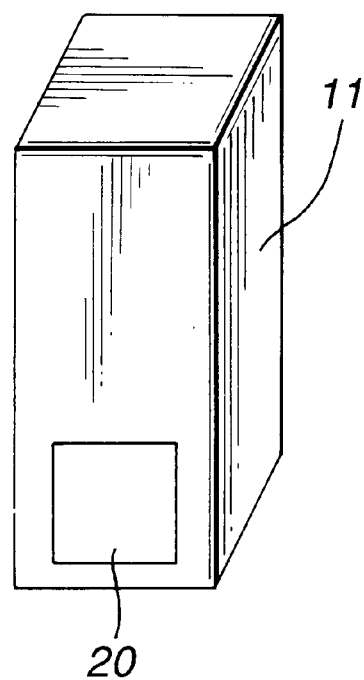
FIG. 2 is a perspective view of a golf ball box according to another embodiment of the invention.

Referring to FIGS. 1 and 2, each of which shows a golf ball box according to embodiments of the present invention, a large box 1 for holding golf balls is shown in FIG. 1, and a small box 11 for holding golf balls is shown in FIG. 2. The large box 1 includes a large box body 2 which holds four of the small boxes 11 for golf balls shown in FIG. 2, and a lid 3 which covers the opening on top thereof. The small box 11 holds three golf balls, and so the large box 1 holds one dozen golf balls.

Figure 3:
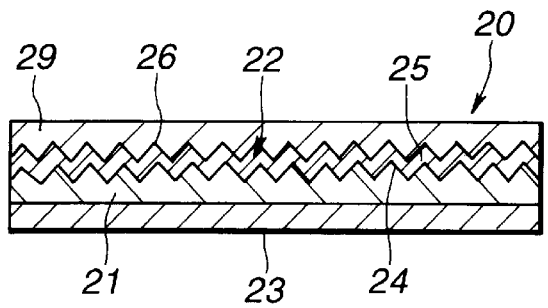
FIG. 3 is a cross-sectional view of a hologram sheet.
Figure 4:
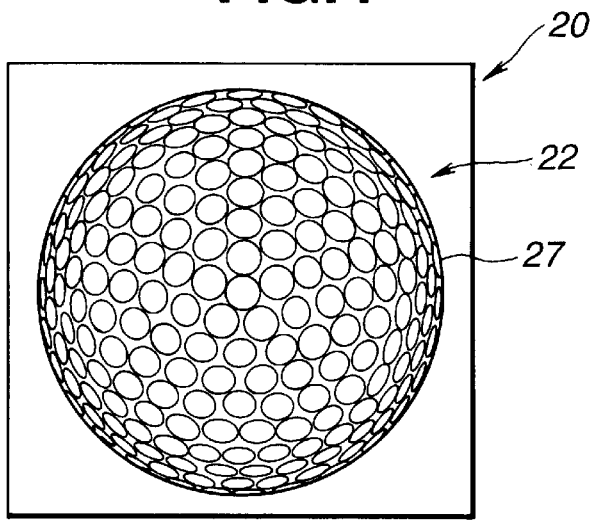
FIG. 4 is a plan view illustrating display by the first regularly reflecting area.
Figure 5:
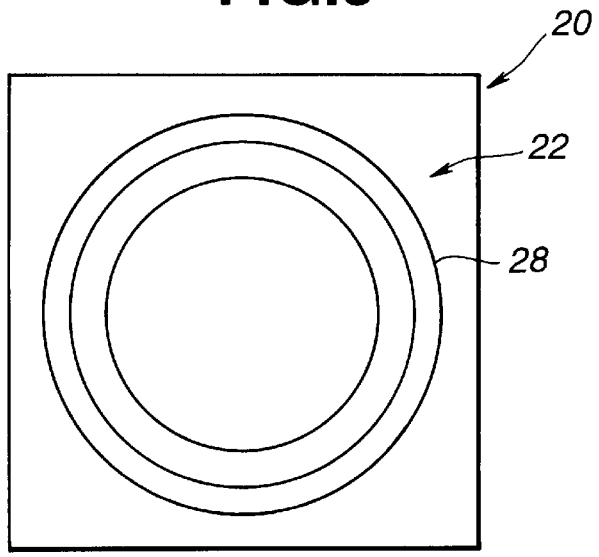
FIG. 5 is a plan view illustrating display by the second regularly reflecting area.

A hologram sheet 20 is affixed to the top of the lid 3 for the large box 1, and a hologram sheet 20 is affixed to the surface of the small box 11. As shown in FIG. 3, the hologram sheet 20 has a hologram layer 22 formed on a base sheet 21, and the sheet is affixed to the lid 3 or the small box 11 by means of an adhesive layer 23 which is formed on the reverse side of the base sheet 21. The hologram layer 22 includes an irregularly reflecting area 26 composed of fine irregularities in an evaporated metal film 25 which covers fine irregularities 24 formed on the base sheet 21; a first regularly reflecting area 27 within the irregularly reflecting area 26 which is composed of planar regions at which places only the aforementioned fine irregularities are not formed, so that incident light from a predetermined angle is regularly reflected for displaying the outward appearance of the golf ball (FIG. 4); a second regularly reflecting area 28, also within the irregularly reflecting area 26, which is composed of planar regions at which places only the aforementioned fine irregularities are not formed, so that incident light from a different angle than the above angle is regularly reflected for displaying the internal structure of the golf ball (FIG. 5); and a clear protective film 29 which covers the evaporated metal film 25.

The base sheet 21 may consist of a plastic film composed of, for example, polyethylene terephthalate, polyolefin, polyamide, polyvinyl chloride or acrylic resin. The evaporated metal film 25 may be formed of, for example, a metal such as aluminum, copper, nickel, chromium, titanium, silver, gold, or an alloy thereof, to a thickness of about 10 to about 10,000 Å. The clear protective film 29 may be formed of a clear plastic such as polyethylene terephthalate, polyolefin or acrylic resin. The finely irregular regions may consist of irregularities with dimensions of about 0.05 to 0.5 $\mu$m, and especially about 0.1 to 0.3 $\mu$m.

The hologram sheet 20 is affixed to the large box 1 or the small box 11. Depending on the angle at which it is viewed, the hologram sheet 20 becomes iridescently colored due to irregular reflection in the irregularly reflecting area 26, displays so as to stand out in relief an external view of the golf ball, or displays in relief the internal structure of the golf ball. This aesthetically embellishes the large box 1 or the small box 11, along with which it attractively displays the appearance and the internal structure of the box contents (golf balls) and is able to convey to the viewer the outward appearance and internal structure of the golf balls, which serves to advantage in the selection of golf balls.

The holographic display on the large box 1 or small box 11 is not limited to the above-described embodiment in which a hologram sheet is affixed to the box. For example, the hologram may be directly formed on or otherwise imparted to the base material of the box. Nor is the hologram layer 22 necessarily constituted as described in the above embodiment, various modifications thereto being possible. So long as there are formed, within an irregularly reflecting area which irregularly reflects incident light, regularly reflecting areas which display the appearance and structure of a golf tool by the regular reflection of incident light from mutually differing angles, other aspects of the invention may be variously modified without departing from the scope thereof. The hologram sheet and the hologram layer may be formed by a method known to the art, such as a transfer process.

According to this invention, a hologram imparts a superb beautifying effect to golf tools such as golf balls, and to packages for such golf tools. Additionally, the hologram can aesthetically display the appearance and internal structure of the golf tools, thereby increasing their commercial value.

I claim:

1. A golf instrument comprising a golf tool or golf tool package having a hologram wherein there is formed an irregularly reflecting area which irregularly reflects incident light, and there are also formed, within said irregularly reflecting area, both a first regularly reflecting area which regularly reflects incident light from a predetermined angle for displaying an external view of the golf tool, and a second regularly reflecting area which regularly reflects incident light from a different angle than the above angle for displaying the internal structure of the golf tool.

2. The golf instrument according to claim 1 comprising a golf ball package having a hologram wherein there is formed an irregularly reflecting area which irregularly reflects incident light, and there are also formed, within said irregularly reflecting area, both a first regularly reflecting area which regularly reflects incident light from a predetermined angle for displaying an external view of the golf ball, and a second regularly reflecting area which regularly reflects incident light from a different angle than the above angle for displaying the internal structure of the golf ball.

* * * * *